United States Patent
Takahashi et al.

(10) Patent No.: US 8,355,841 B2
(45) Date of Patent: Jan. 15, 2013

(54) TURNING BEHAVIOR DISPLAY DEVICE

(75) Inventors: Naoki Takahashi, Tokyo (JP); Kaoru Sawase, Tokyo (JP); Yuichi Ushiroda, Tokyo (JP); Keiji Suzuki, Tokyo (JP); Takami Miura, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 1058 days.

(21) Appl. No.: 12/015,339

(22) Filed: Jan. 16, 2008

(65) Prior Publication Data

US 2009/0030572 A1   Jan. 29, 2009

(30) Foreign Application Priority Data

Jul. 24, 2007   (JP) .................................. 2007-192594

(51) Int. Cl.
*B60W 10/20*   (2006.01)

(52) U.S. Cl. .................. 701/41; 701/1; 701/36; 701/42; 340/439; 340/438

(58) Field of Classification Search .............. 701/1, 36, 701/41, 42; 340/438, 439
See application file for complete search history.

(56) References Cited

U.S. PATENT DOCUMENTS

| 5,479,715 | A |   | 1/1996  | Schultheis et al. |
|-----------|---|---|---------|-------------------|
| 5,956,260 | A | * | 9/1999  | Heger et al. ................... 702/154 |
| 6,125,953 | A | * | 10/2000 | Arai et al. .................. 180/6.28 |
| 7,145,442 | B1| * | 12/2006 | Wai .............................. 340/438 |

FOREIGN PATENT DOCUMENTS

| DE | 198 42 808 A1 | 3/1999 |
|----|---------------|--------|
| JP | 3074266 A     | 3/1991 |
| JP | 5-15046 Y2    | 4/1993 |
| JP | 6-336166 A    | 12/1994|
| JP | 11-98603 A    | 4/1999 |
| JP | 2007-131229 A | 5/2007 |

* cited by examiner

*Primary Examiner* — Tashiana Adams
*Assistant Examiner* — Jacob Knutson
(74) *Attorney, Agent, or Firm* — Birch, Stewart, Kolasch & Birch, LLP

(57) ABSTRACT

A turning behavior display device, operable to display control condition of a turning behavior control unit which controls turning behavior of a vehicle in a turning direction by using a relative difference between a first torque acting on one of left and right wheels of the vehicle and a second torque acting on the other of the left and right wheels of the vehicle, includes: first display portions, provided for the left and right wheels, and adapted to increase or decrease in the turning direction in accordance with the relative difference from a reference section used when the first torque is equal to the second torque.

5 Claims, 7 Drawing Sheets

FIG. 7

| NUMBER OF SEGMENTS | 1seg | 2seg | 3seg | 4seg | 5seg |
|---|---|---|---|---|---|
| ACD CONTROL LEVEL | | | | | |
| RIGHT-TURN YAW MOMENT CONTROL LEVEL | | | | | |
| LEFT-TURN YAW MOMENT CONTROL LEVEL | | | | | |

TURNING BEHAVIOR DISPLAY DEVICE

BACKGROUND OF THE INVENTION

1. Field of the Invention

The present invention relates to a turning behavior display device for displaying controlling conditions of turning behavior of a vehicle having a turning behavior control unit.

2. Description of the Related Art

Various related techniques have hitherto been put forward for enhancing the safety of a vehicle by means of attempting stabilization of a vehicle in course of turning action. For instance, a related technique is to feedback-control a difference between the driving force of left wheels and that of right wheels of a vehicle and brake force exerted on the respective wheels in accordance with a yaw rate of the vehicle, or another related technique is to feedback-control an electronic control LSD (Limited Slip Differential) of a center differential gear which varies the degree of differential limit on front wheels and the degree of differential limit on rear wheels, in accordance with a yaw rate of the vehicle (see; e.g., JP-A-2007-131229).

According to the technique described in JP-A-2007-131229, the degree of differential limit on the front and rear wheels and the torque and brake applied to the right and left wheels of the vehicle by right and left wheel torque generators are controlled in a consolidated manner, by application of yaw rate feedback control. A disclosed technique limited solely to prevention of oversteering is to control differential movement between the front and rear wheels by means of the center differential so as to intensify force of constraint in conjunction with controlling of torque acting on the left and right wheels of the vehicle.

When such turning behavior control unit is put into practice, a driver can ascertain conditions of turning behavior control by means of displaying the amount of control of torque acting on the right and left wheels and the degree of force of constraint (the degree of differential limit). Thus, the traveling performance and safety performance of the vehicle can be effectively utilized.

A technique for displaying; for example, a driving force distribution ratio and the magnitude of torque acting on the left wheels and the magnitude of torque acting on the right wheels, has already been proposed as a related technique for displaying; for example, the amount of control of the torque acting on the left and right wheels and a distribution ratio (the degree of differential limit) of driving force exerted on the front and rear wheels (see; for example, JP-A-11-98603 and JP-UM-B-5-15046 provided below).

A hitherto-proposed related display device displays the intensity of force of constraint based on the driving force distribution ratio is displayed by means of the degree of a display condition (the amount indicated by a scale), and displays the magnitude of torque on the left wheels and the magnitude of torque on the right wheels are displayed by means of the degree of a display condition (the amount indicated by a scale). The driver visually ascertains the force of constraint of the vehicle and the state of torque acting on the right and left wheels by means of the display condition, thereby perceiving control conditions of turning behavior (a turning force status) of the vehicle according to the state of constraining force of the vehicle and the state of torque acting on the right and left wheels.

However, the related display device displays the intensity of the force of constraint based on the driving force distribution ratio, the magnitude of the torque acting on the left wheels, and the magnitude of the torque acting on the right wheels, respectively. When the respective conditions are displayed simultaneously, a display becomes complicated, which deteriorates driver's visibility. For this reason, control conditions of turning behavior (i.e., the turning force status) are estimated by means of a difference between the magnitudes of torques exerted on the right wheels. Therefore, difficulty is encountered in instantaneously ascertaining the control conditions of the turning behavior (the turning force status) of the vehicle. As a result, it may be difficult for the driver to perform driving while accurately ascertaining the conditions of the vehicle. As things stand now, the most of the traveling and safety performance of the vehicle is not effectively utilized.

SUMMARY OF THE INVENTION

The turning behavior display device of the present invention enables instantaneous recognition of control conditions of the turning behavior (a turning force status) of a vehicle, thereby enabling reliable, effective utilization of traveling and safety performance of a vehicle.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 7 shows transition conditions of the segment.

DETAILED DESCRIPTION OF THE INVENTION

A vehicle to which a turning behavior display device of the present invention is applied is a four-wheel drive vehicle, and has a system including an antilock brake system (ABS), an active center differential (ACD) for controlling the force of differential limiting force applied to front and rear wheels, active yaw control (AYC) for controlling driving forces exerted on the right and left rear wheels, and active stability control (ASC) for controlling brake forces applied to the four wheels. The vehicle is equipped with a turning behavior controller which exhibits both turning performance and acceleration performance by controlling the system in a consolidated manner. The vehicle equipped with the turning behavior display device, for example, during cornering or deceleration, controls driving force exerted on the right and left rear wheels and intensifies the differential limiting force exerted on the front and rear wheels, thereby enhancing safety. In order to enhance the turning performance of the vehicle in turning, the driving force exerted on the right and left rear wheels is controlled, and the differential limiting force exerted on the front and rear wheels is weakened.

The turning behavior display device of the present invention is a display device which displays control conditions of turning behavior (a turning force status) of the vehicle in the turning behavior controller; namely, control conditions of driving forces exerted on the right and left rear wheels and control conditions of intensity of the differential limiting forces applied to the front and rear wheels. The display device is arranged so as to enable the driver to visually ascertain the turning force status in an intuitive manner, thereby instantaneous perceiving control conditions of the turning behavior.

An embodiment of the present invention will be described hereunder by reference to the drawings.

Figure 1:
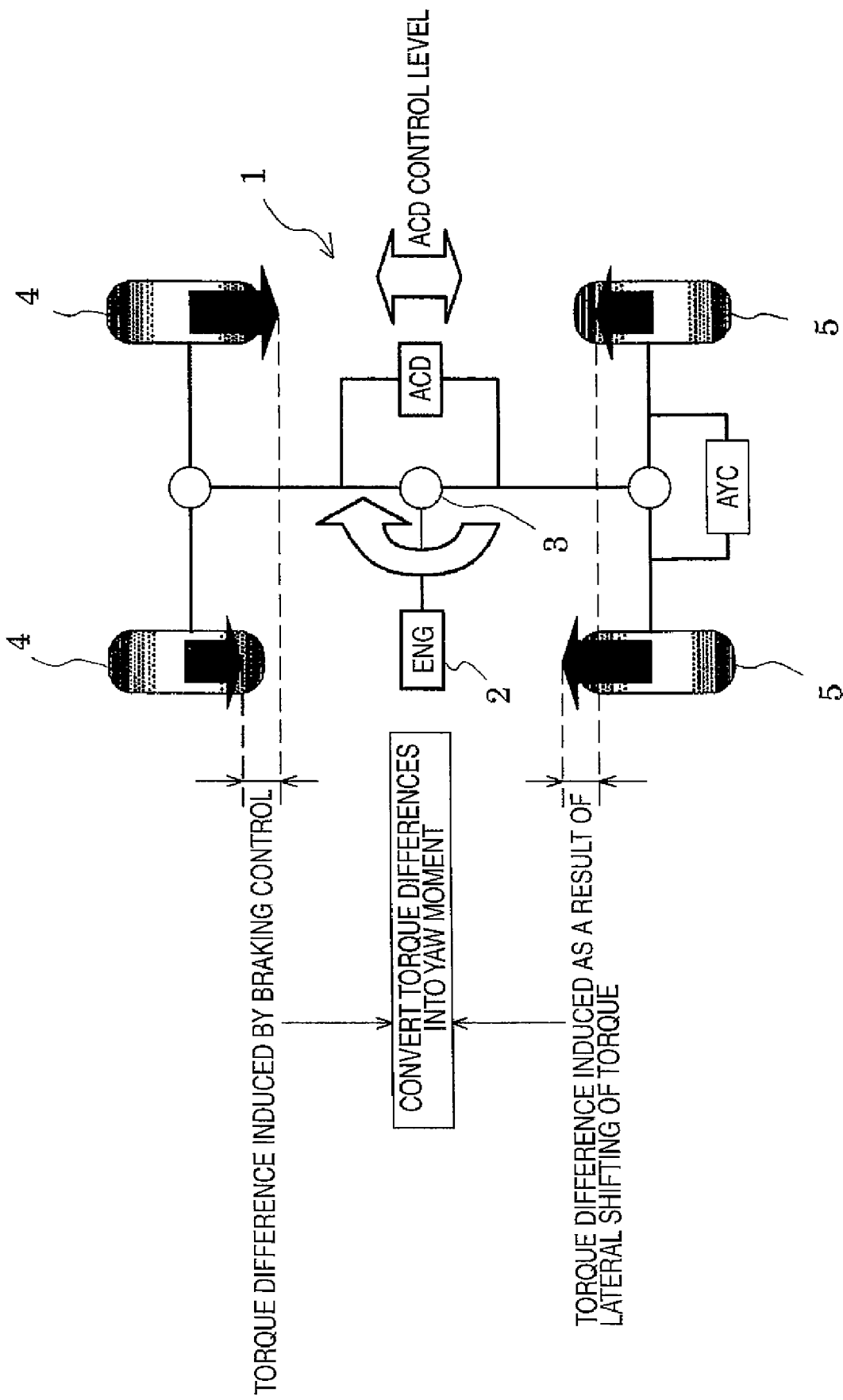
FIG. 1 is a conceptual rendering showing control conditions of turning behavior of a vehicle to which a turning behavior display device of an embodiment of the present invention is applied.
Figure 2:
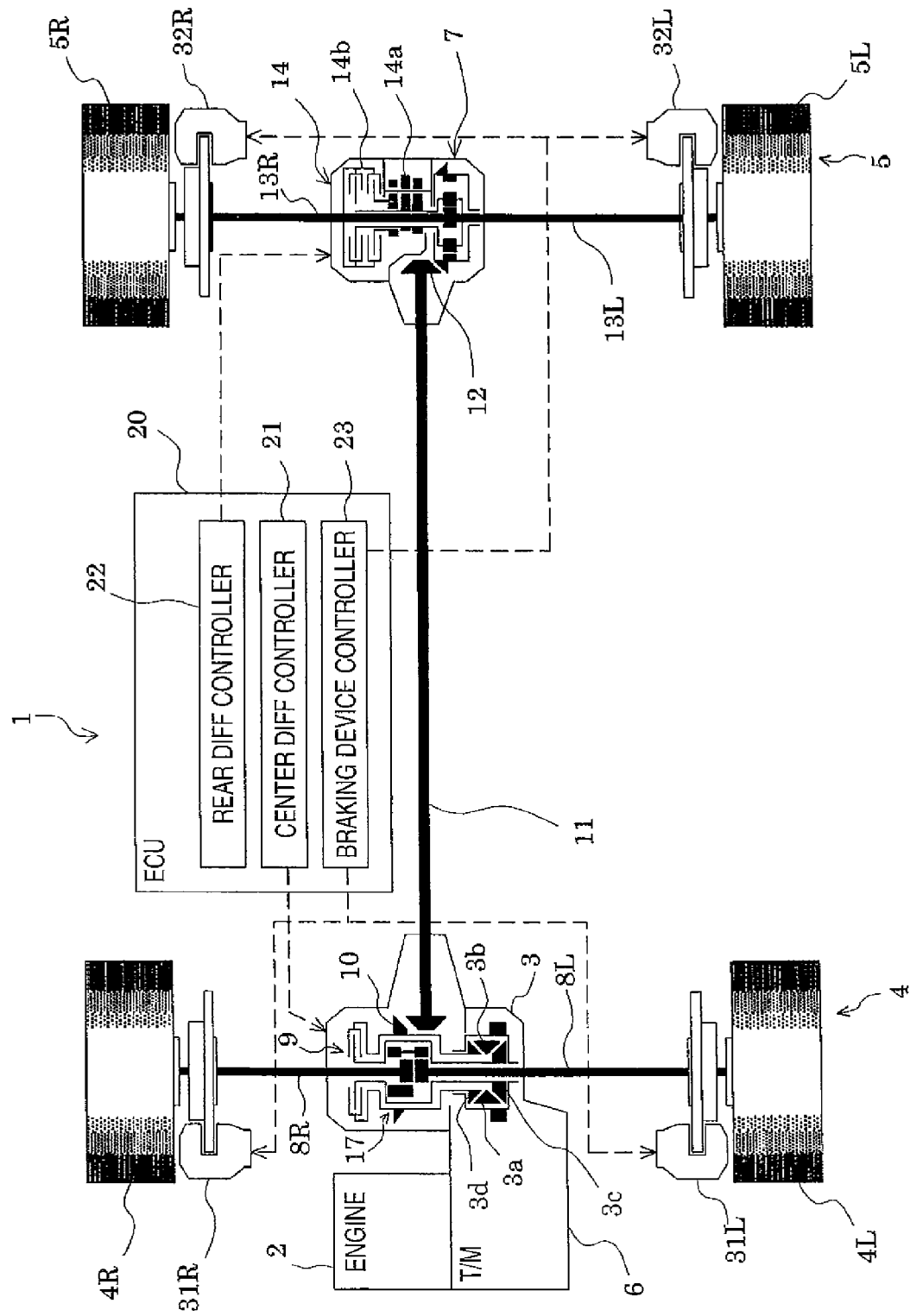
FIG. 2 shows a general configuration of the vehicle equipped with the turning behavior display device.
Figure 3:
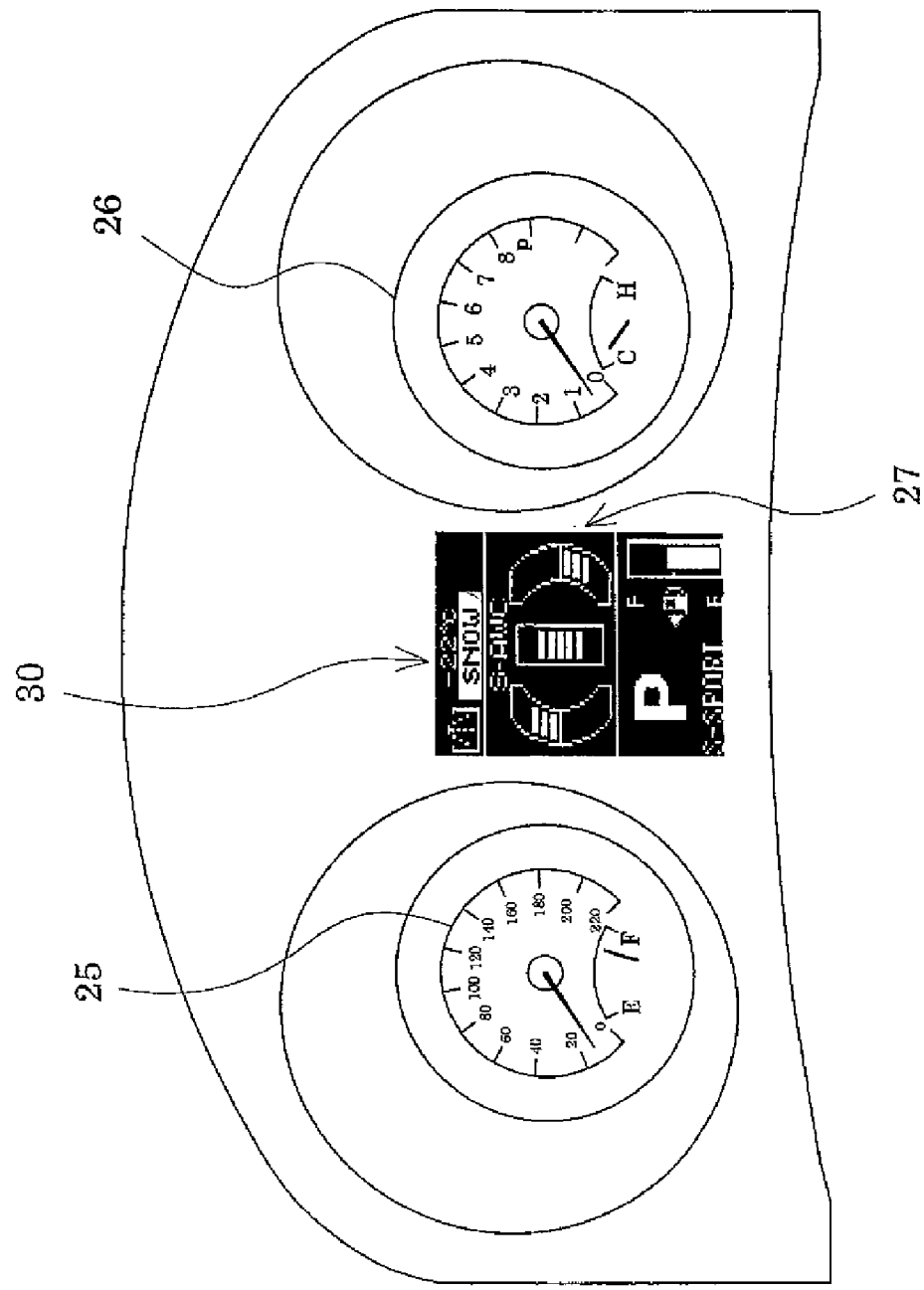
FIG. 3 shows the entirety of a dashboard equipped with the turning behavior display device of the embodiment of the present invention.
Figure 4:
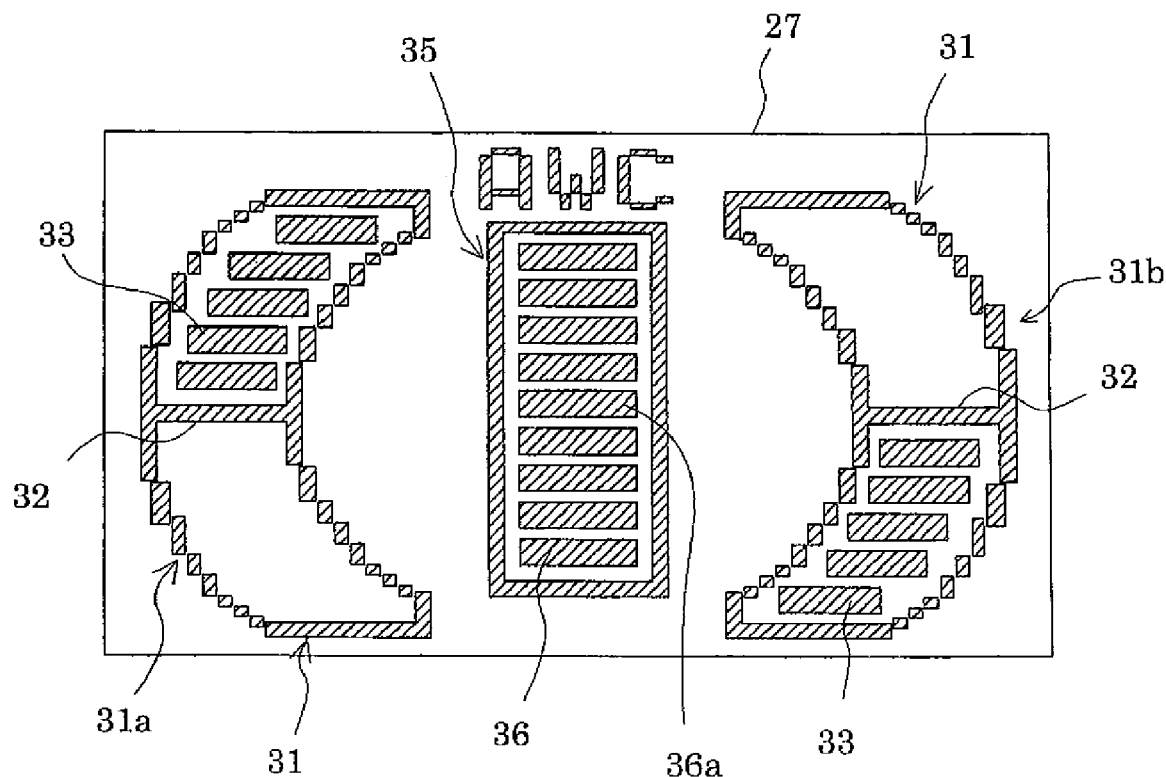
FIG. 4 shows detailed conditions of the turning behavior display device of the embodiment of the present invention.
Figure 5:
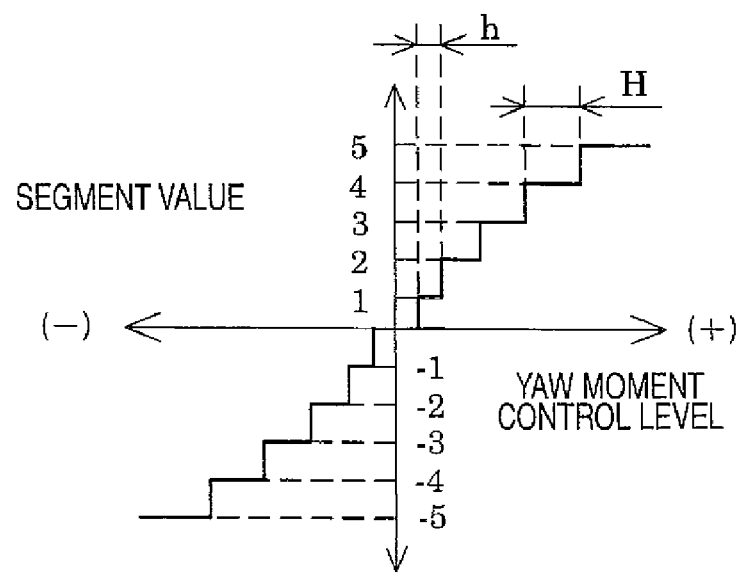
FIG. 5 shows a relationship between the amount of control of yaw moment and a segment value.
Figure 6:
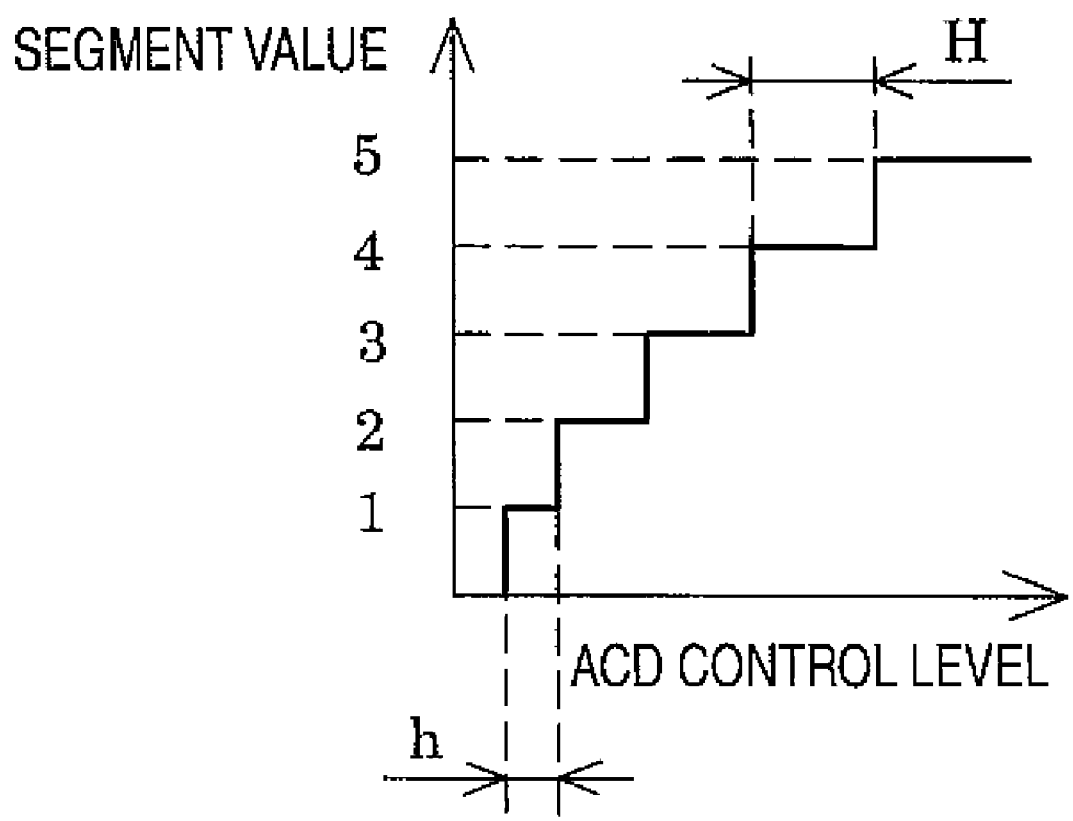
FIG. 6 shows a relationship between the amount of ADC control and a segment value.

FIG. 1 is a conceptual rendering showing control conditions of turning behavior of a vehicle to which a turning behavior display device of an embodiment of the present invention is applied, and FIG. 2 shows a general configuration of the vehicle equipped with the turning behavior display device. FIG. 3 shows the entirety of a dashboard equipped with the turning behavior display device of the embodiment of the present invention. FIG. 4 shows detailed conditions of the turning behavior display device of the embodiment of the present invention. FIG. 5 shows a relationship between the amount of control of yaw moment and a segment value. FIG. 6 shows a relationship between the amount of ADC control and a segment value. FIG. 7 shows transition conditions of the segment. In addition, FIGS. 8A to 8F show another examples of the turning behavior display device of the present invention.

The turning behavior display device of the vehicle to which the turning behavior display device of the embodiment of the present invention is applied will be described by reference to FIGS. 1 and 2.

As shown in FIG. 1, in a vehicle 1, driving force of an engine 2 is distributed to front wheels 4 and rear wheels 5 by means of a center differential (center diff) 3, thereby controlling the intensity of differential limiting force exerted on the front and rear wheels (the amount of ACD control). Further, a torque difference ascribable to the control of right and left brakes applied to the front wheels 4 and a torque difference ascribable to a shifting torque between the right and left rear wheels 5 are converted into yaw moment, and the yaw moment is taken as an amount of yaw moment of the vehicle 1 to be controlled (an amount of yaw moment control of the vehicle). The turning behavior display device of the present invention is to display, on an indicator, the intensity of differential limiting force applied to the front and rear wheels (the amount of ACD control) and the amount of yaw moment control.

An overview of the vehicle equipped with the turning behavior display device will be described by reference to FIG. 2.

The vehicle 1 is equipped with the engine 2, and an output from the engine 2 is transmitted to the center diff 3 by way of a transmission 6 and an intermediate gear mechanism 17. The output transmitted to the center differential 3 is transmitted to a right front wheel 4R by way of an axle shaft 8R as well as to a left front wheel 4L by way of an axle shaft 8L.

The center diff 3 is equipped with differential pinions 3a and 3b, and side gears 3c and 3d meshing with the differential pinions 3a and 3b are provided. Torque input by way of the differential pinions 3a and 3b is transmitted to the front wheels 4 by way of the side gear 3c, and torque input by way of the differential pinions 3a and 3b is transmitted to the rear wheels 5 by way of the side gear 3d and a propeller shaft 11.

The center diff 3 allows differential motion between the front wheels 4 and the rear wheels 5.

The center diff 3 is also provided with a front-rear wheel differential limiting mechanism 9 exhibiting the function of controlling the driving performance of the vehicle (the function of a turning behavior unit) by means of adjusting the degree of differential limit imposed on the front wheels 4 and the degree of differential limit imposed on the rear wheels 5.

The front-rear wheel differential limiting mechanism 9 variably distributes the torque output from the engine 2 to the front wheels 4 and the rear wheels 5 while the allowed differential motion between the front wheels 4 and the rear wheels 5 is being variably limited. Specifically, the front-rear wheel differential limiting mechanism 9 includes a wet-type multiple disc clutch mechanism, and the degree of differential limit on the front wheels 4 and the degree of differential limit on the rear wheels 5 are adjusted according to hydraulic pressure from an unillustrated hydraulic unit (ACD control).

Hydraulic pressure acting on the front-rear wheel differential limiting mechanism 9 is controlled in accordance with a command from a center diff controller 21 of an ECU (Electronic Control Unit) 20.

The output transmitted to a rear diff 7 is transmitted to a right rear wheel 5R by way of an axle shaft 13R as well as to a left rear wheel 5L by way of an axle shaft 13L. The rear diff 7 is equipped with a right-left wheel driving force shift mechanism 14 serving as a turning behavior unit which controls turning behavior (yaw moment) of the vehicle 1 by means of inducing a torque difference between drive torque acting on the left rear wheel 5L and drive torque acting on the right rear wheel 5R.

The right-left wheel driving force shift mechanism 14 includes a transmission mechanism 14a and a torque transmission mechanism 14b of transmission capacity variable control type. The transmission mechanism 14a is for accelerating or decelerating rotational speed of one rear wheel; that is, the left rear wheel 5L, and outputting the rotational speed to the torque transmission mechanism 14b. The torque transmission mechanism 14b includes a wet-type multiple disc clutch mechanism capable of adjusting transmission torque capacity. The torque transmission mechanism 14b utilizes a difference between the rotational speed of the left rear wheel 5L accelerated or decelerated by the transmission mechanism 14a and the rotational speed of one rear wheel; that is, the right rear wheel 5R, thereby exchanging torque (shifting torque) between the left rear wheel 5L and the right rear wheel 5R. As a result of exchange of torque between the left rear wheel 5L and the right rear wheel 5R, the drive torque acting on one wheel is increased or decreased, so that the drive torque acting on the other wheel can be decreased or increased.

The hydraulic pressure acting on the right-left wheel driving force shifting mechanism 14 is controlled in accordance with a command from a rear diff controller 22 of the ECU 20.

For instance, when hydraulic pressure acts on the right-left wheel driving force shifting mechanism 14 during the course of the vehicle 1 advancing while turning in a right direction, to thus decrease the torque transmitted to the right rear wheel 5R, the right rear wheel 5R is decelerated. At this time, the torque transmitted to the left rear wheel 5L is increased, whereupon the left rear wheel 5L is accelerated. Thus, clockwise (right-handed) yaw moment can be generated (AYC control).

The right and left front wheels 4 of the vehicle 1 are provided with braking devices 31R and 31L, and the right and left rear wheels 5 are equipped with braking devices 32R and 32L. The braking devices 31R and 31L and the braking devices 32R and 32L are independently supplied with hydraulic pressure, and braking conditions of the respective right and left front wheels 4 and braking conditions of the respective right and left rear wheels 5 are controlled. The hydraulic pressure acting on the braking devices 31R, 31L, 32R, and 32L are controlled in accordance with a command from a braking device controller 23 of the ECU 20.

When braking conditions are controlled, for example; a difference between the braking forces applied to the right and left front wheels 4 (a brake torque difference) induces turning force in the vehicle 1. The brake torque difference between the right and left front wheels 4 and a brake torque difference between the right and left rear wheels 5 are integrated together, to thus be taken as yaw moment of the vehicle 1.

In the foregoing vehicle 1, for example; a steering angle, braking pressure, a longitudinal yaw rate of the vehicle 1, and a lateral yaw rate of the vehicle 1 achieved during traveling, are detected, and the degree of differential limit on the front wheels 4 and the rear wheels 5 is adjusted; the torque difference between the right rear wheel 5R and the left rear wheel 5L is adjusted; and braking forces applied to the right and left front wheels 4 and the right and left rear wheels 5 are independently controlled. For instance, right and left driving force applied to the rear wheels is controlled at the time of cornering or deceleration, and the differential limiting force on the front and rear wheels is increased, to thus enhance stability. In order to enhance the turning-around performance of the vehicle, in the middle of turning operation, the driving force applied to the right and left rear wheels is controlled, and the differential limiting force exerted on the front and rear wheels is weakened.

Thus, the behavior of the vehicle 1 in a limit driving range can be assisted, and high turning-around performance and high stability can be ensured. Therefore, for instance, turning operation performed on a low-u road requires a small amount of corrected steering, so that stability and controllability are enhanced. Even in the event of emergency evasive action, disorder in the behavior attributable to harsh steering operation is little, and stability and ease of convergence are enhanced.

The turning behavior display device of the present invention displays the intensity of differential limiting force applied to the front and rear wheels (the amount of ACD control) and the amount of yaw moment control (a segment value) into which the torque difference induced by control of braking of the right and left front wheels 4 and the torque difference induced by shifting of torque between the right and left rear wheels 5 are integrated. The display device enables the driver to instantaneously ascertain control conditions of turning behavior (the turning force status) of the vehicle 1, thereby attempting reliable, effective utilization of traveling and safety performance of the vehicle 1.

The turning behavior display device of the embodiment of the present invention will be described by reference to FIGS. 3 through 7.

As shown in FIG. 3, a vehicle condition display device 30 is interposed between a speed meter 25 and a tachometer 26 in a dashboard located in front of a driver's seat, and a turning behavior display device 27 is displayed on the vehicle condition display device 30. For instance, a display device for required information is displayed by means of the driver touching a panel, and one of a plurality of display devices acts as the turning behavior display device 27. In addition to the turning behavior display device 27 being displayed in an illustrated example, an outdoor temperature, a road surface condition, a driving mode, and a remaining quantity of fuel are displayed.

As shown in FIG. 4, the turning behavior display device 27 is provided with a yaw moment display section 31 which displays the amount of yaw moment control, and a differential limit display section 35 which shows the intensity of differential limiting force applied to the front and rear wheels. The yaw moment display section 31 has, side by side, a left display section 31a and a right display section 31b. The left display section 31a and the right display section 31b are embodied as concentrically-arranged circular-arc patterns. Reference sections 32 where a balance between the torque acting on the right wheel and the torque acting on the left wheel is attained are provided at vertical midpoints of the respective left and right display sections 31a, 31b.

A plurality of rectangular segments 33 (five segments in the illustrated embodiment) are displayed in each of the right display section 31b and the left display section 31a. When the segments 33 are displayed at positions above the reference section 32 of the left display section 31a, the segments 33 in equal number to the display segments are displayed below the reference section 32 of the right display section 31b. The number of segments 33 is set according to a torque difference between torque acting on outer wheels and torque acting on inner wheels; namely, the amount of yaw moment control, and the number of segments 33 displayed in sequence from the reference section 32 in a turning direction increases or decreases so as to draw a circular-arc pattern. The number of segments 33 of the right display section 31b and the number of segments 33 of the left display section 31a are symmetrical with each other.

For instance, in the case of a state shown in FIG. 4, there is shown a state where the maximum amount of yaw moment control has developed in the direction of the right turn. Specifically, the state shown in FIG. 4 corresponds to a state where drive torque acting on the left rear wheel 5 is large and where the drive torque acting on the right rear wheel 5 is small. In this case, yaw moment into which drive torque and brake control torque are converted acts on a right-turning side, and a torque difference between the torque acting on the left wheels and the torque acting on the right wheels is displayed in the form of the number of the segments 33 sequentially appearing above the standard section 32 on the left display section 31a (i.e., an increasing manner in the turning direction). Segments in equal number to these segments are also displayed in sequence below the reference section 32 on the right display section 31b (i.e., an increasing manner in the turning direction).

In the meantime, the differential limit display section 35 is interposed between the right display section 31b and the left display section 31a of the yaw moment display section 31. The degree of differential limit is displayed in the form of a plurality of rectangular segments 36 in the differential limit display section 35. Segments 36 which are equal in number to each other are displayed above and below the center segment 36a. A vertical display position of the center segment 36a is made identical with the positions of the reference sections 32 of the yaw moment display sections 31. As the intensity of the differential limiting force exerted on the front and rear wheels (i.e., the amount of ACD control) becomes greater, the number of displayed segments 36 increases vertically. An example shown in FIG. 4 corresponds to a case where the maximum intensity (the maximum amount of ACD control) is achieved and where the driving performance of the vehicle 1 (see FIG. 1) is made high.

A relationship between the amount of yaw moment control and the number of displayed segments 33 (a calculated segment value) is described by reference to FIG. 5. A relationship between the amount of ACD control and the number of displayed segments 36 (a calculated segment value) is described by reference to FIG. 6.

As shown in FIG. 5, the segment value is set from one to five as the amount of yaw moment control relatively increases. A positive amount of yaw moment control shows a left turn, and a negative amount of yaw moment control shows a right turn. Moreover, when the segment value is positive, segments are displayed downwardly in the left display section 31a, and segments displayed upwardly in the right display section 31b. When the segment value is negative, segments are displayed downwardly in the left display section 31a, and segments are displayed upwardly in the right display section 31b.

As the amount of yaw moment control increases, a rate of an increasing or decreasing change in the display status is set so as to become slower. Specifically, when the segment value assumes one, there is set an amount of yaw moment control "h." When the segment value assumes four, there is set a large amount (a long period) of yaw moment control H. Settings are made such that the greater (smaller) the amount of yaw moment control, switching of the segment 33 becomes slower (quicker).

As a result, even when the amount of yaw moment control is small, the display of the segment 33 can be increased or decreased without fail. Further, when the amount of yaw moment control is large, an unwanted increase or decrease in the number of displayed segments 33 can be prevented. An unerring display can be provided regardless of the amount of yaw control.

As shown in FIG. 6, segment values are set from one to five on the part of the display section where the amount of ACD control becomes greater, whereby the number of displayed segments 36 increases. Specifically, enhancement of driving performance of the vehicle 1 (see FIG. 1) is displayed by means of displaying the segments 36. Settings are made such that, the greater the amount of ACD control, the slower the rate of an increasing or decreasing change in a display status. Specifically, when the segment value assumes one, there is set an amount of ACD control "h." When the segment value assumes four, there is set a larger amount (a longer period) of yaw moment control H. Settings are made such that, the greater (smaller) the amount of ACD control, the slower (faster) switching of the display of the segments 36.

As a result, even when the amount of ACD control is small, the display of the segments 36 can be increased or decreased without fail. When the amount of ACD control is larger occurrence of an unwanted increase or decrease in the display of the segments 36 can be prevented. Thus, an appropriate display can be provided without regard to the amount of ACD control.

The condition of transition of a segment will be described by reference to FIG. 7. Reference numerals provided in the following descriptions are the same as those shown in FIG. 4. Hence, descriptions are provided by reference to FIG. 4.

In relation to the condition of the segment 36 corresponding to the amount of ACD control, when the segment value is one, a center segment 36a is displayed. When the segment value is two, one segment above and another below the center segment 36a are additionally displayed in conjunction with the center segment 36a, whereby a total of three segments 36 are displayed. Likewise, when the segment value is three, a total of five segments 36 are displayed. When the segment value is four, a total of seven segments 36 are displayed. When the segment value is five, a total of nine segments 36 are displayed.

The case where the amount of ACD control becomes greater corresponds to a state where driving performance of the vehicle (see FIG. 1) is enhanced. Hence, the number of segments 36 can be ascertained to increase from the center segment 36a in the vertical direction of the differential limit display section 36.

In relation to the condition of the segments 33 corresponding to the amount of yaw moment control performed during a right turn, when the segment value is one, one segment 33 is displayed above the reference section 32 in the left display section 31a. Further, one segment 33 is displayed below the reference section 32 in the right display section 31b. When the segment value is two, two segments 33 are displayed above the reference section 32 in the left display section 31a, and two segments 33 are displayed below the reference section 32 in the right display section 31b. Thus, the driver can intuitively ascertain that the current operation corresponds to assistance in the right turn.

Likewise, every time the number of segments values increase by one, one segment 33 is added above the reference section 32 in the left display section 31, and one segment 33 is added below the reference section 32 in the right display section 31b. When the segment value is five, five segments 33 are displayed above the reference section 32 in the left display section 31a. Five segments 33 are display below the reference section 32 in the right display section 31b. Thus, the driver can intuitively ascertain that assistance in the left turn is great.

In relation to the condition of the segments 33 corresponding to the amount of yaw moment control performed during a left turn, when the segment value is one, one segment 33 is displayed below the reference section 32 in the left display section 31a. Further, one segment 33 is displayed above the reference section 32 in the right display section 31b. When the segment value is two, two segments 33 are displayed below the reference section 32 in the left display section 31a, and two segments 33 are displayed above the reference section 32 in the right display section 31b. Thus, the driver can intuitively ascertain that the current operation corresponds to assistance in the left turn.

Likewise, every time the number of segments values increase by one, one segment 33 is added below the reference section 32 in the left display section 31, and one segment 33 is added above the reference section 32 in the right display section 31b. When the segment value is five, five segments 33 are displayed below the reference section 32 in the left display section 31a. Five segments 33 are display above the reference section 32 in the right display section 31b. Thus, the driver can intuitively ascertain that assistance in the left turn is great.

In the turning behavior display device 27, the number of segments 33 displayed in the turning direction from the reference section 32 of the yaw moment display section 31 increases or decreases in the form of a circular-arc shape in accordance with a relative difference between the torque acting on turning outer wheels and the torque acting on turning inner wheels. Accordingly, the driver can visually, intuitively ascertain the amount of yaw moment control of the vehicle 1 (see FIG. 1); namely, the control condition of the turning behavior (the turning force status). Consequently, instantaneous ascertainment of control condition of the turning force is enabled. The traveling performance and safety performance of the vehicle 1 (see FIG. 1) can be effectively utilized without fail. Moreover, a display level of the left display section 31a and a display level of the right display section 31b are set so as to become equal to each other. Hence, the magnitude and direction of yaw moment control can be visually ascertained with accuracy.

Since the differential limit display section 35 is interposed between the left display section 31a and the right display section 31b of the yaw moment display section 31, the control condition of degree of differential limit is displayed between the control condition of turning force of the left wheels and the control condition of turning force of the right wheels, and the degree of control is displayed with reference to the center sections 32. Thereby, the control condition of a turning force status, incorporating driving performance of the vehicle 1, can be visually ascertained more intuitively.

The above embodiment has been described by means of taking, by way of example, a case where the differential limit display section 35 is interposed between the left display section 31*a* and the right display section 31*b* of the yaw moment display section 31. However, the essential requirement is to include at least the yaw moment display section 31. More specifically, in the present embodiment, the condition of ACD control of the four-wheel drive vehicle for controlling differential limiting force exerted on the front and rear wheels has been displayed. However, in the case of a two wheel drive vehicle, the vehicle can have only the yaw moment display section 31.

Descriptions are provided by reference to the example where the amount of yaw moment control is displayed by the system which controls a torque difference between the torque acting on the left rear wheel and the torque acting on the right rear wheel and a difference between the brake control torque acting on the left front wheel and the brake control torque acting on the right front wheel, thereby integrally controlling yaw moment. However, the amount of yaw moment acquired by means of active yaw control (AYC) for controlling a torque difference between the torque acting on the left rear wheel and the torque acting on the right rear wheel can also be displayed. Moreover, the amount of yaw moment acquired by means of a system for controlling a difference between the brake control torque acting on the left front wheel and the brake control torque acting on the right front wheel can also be displayed.

Another examples of the turning behavior display device of the present invention will be described by reference to FIGS. 8A to 8F.

Figure 8C:
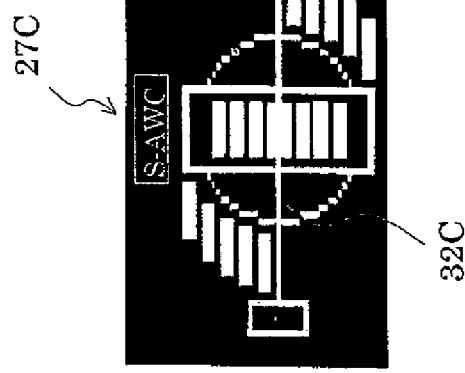
FIGS. 8A to 8F show another examples of the turning behavior display device of the present invention.
Figure 8F:
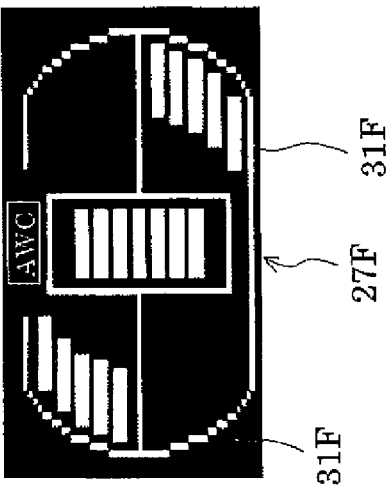
Figure 8B:
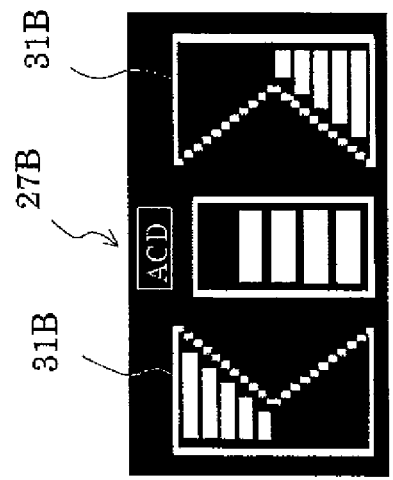
Figure 8E:
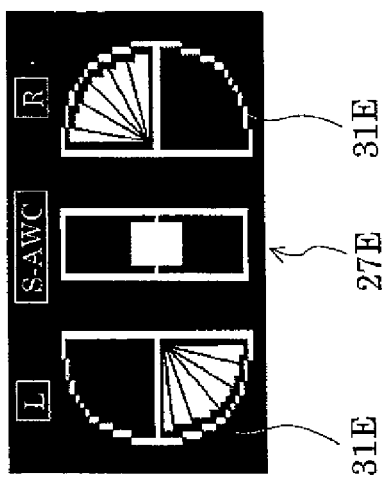
Figure 8A:
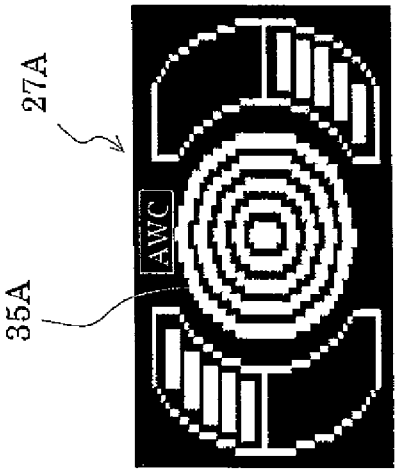

A turning behavior display device 27A shown in FIG. 8A is arranged so as to display segments of the differential limit display section 35A in such a way that the segments increase or decrease in a concentric pattern. Therefore, it becomes easy to visually ascertain an increase or decrease in the amount of ACD control.

A turning behavior display device 27B shown in FIG. 5B is arranged in such a way that segments of the yaw moment display section 31B are displayed longer as the amount of yaw moment control increases. Therefore, the amount of assistance in turning control becomes easy to visually ascertain.

Figure 8D:
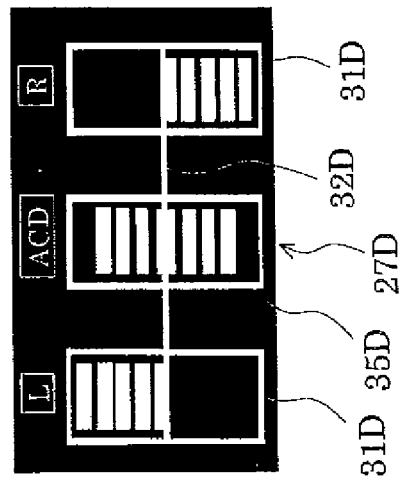

A turning behavior display device 27C shown in FIG. 8C is arranged in such a way that a reference section 32C is displayed integrally. Therefore, it becomes easy to visually ascertain, in an integrated fashion, the condition of assistance of turning control and the condition of ACD control, A turning behavior display device 27D shown in FIG. 8D is arranged in such a way that a reference section 32D is displayed integrally and such that a yaw moment display section 31D and a differential limit display section 35D are displayed in the same form. Therefore, a simple display enables easy ascertainment of a control condition.

A turning behavior display device 27E shown in FIG. 8E is arranged in such a way that a display of a yaw moment display section 31E increases or decreases in the form of a fan-shaped pattern. Therefore, it becomes easy to consecutively ascertain the amount of assistance in turn control.

A turning behavior display device 27F shown in FIG. 8F is arranged so as to provide a display not having inner frames in a yaw moment display section 31F. Therefore, it becomes more easy to ascertain, in an integrated fashion, the condition of assistance in turn control and the condition of ACD control.

As shown in FIGS. 8A to 8F, conditions of control operations being practiced, such as ACD (active center differential), AWC (all-wheel control), S-AWC (super all-wheel control), and the like, can also be displayed simultaneously.

According to an aspect of the invention, a display status for the left wheel (s) (the first portion) and a display status for the right wheel(s) (the first portion) which extend from the reference section in the turning direction increase or decrease according to a relative difference between torque acting on turning outer wheel(s) and torque acting on turning inner wheel(s). Hence, the control condition of turning behavior (the turning force status) of the vehicle can be visually ascertained in an intuitive manner. Consequently, the control condition of turning force can be instantaneously ascertained, and the traveling performance and safety performance of the vehicle can be effectively utilized without fail.

The turning behavior control unit is applied to an active yaw control (AYC) system for controlling a difference between torque acting on the left wheel(s) and torque acting on the right wheel(s) or a system for controlling a difference between brake control torque acting on the left wheel(s) and brake control torque acting on the right wheel(s). Moreover, the turning behavior control unit is applied to a system which controls a difference between torque acting on the left wheel(s) and torque acting on the right wheel(s) and a difference between brake control torque acting on the left wheel(s) and brake control torque acting on the right wheel(s), thereby integrally controlling yaw moment.

According to an aspect of the invention, a display of an identical level is set upwardly and downwardly with respect to the reference section on the side where torque is made greater and the side where torque is made smaller. Hence, the magnitude and direction of torque acting on the left wheel(s) and the magnitude and direction of torque acting on the right wheel (s), which are determined by control of turning behavior (the turning force status) of the vehicle, can be visually ascertained with accuracy.

According to an aspect of the invention, a control condition of turning behavior (the turning force status) of the vehicle can be visually ascertained, in an intuitive manner, by means of the number of displayed plural segments.

According to an aspect of the invention, since the display status increases or decreases in the form of a circular-arc pattern, the control condition of a turning force state of the vehicle can be visually ascertained more intuitively.

According to an aspect of the invention, even when the amount of control of the turning force is small, the display status can be increased or decreased without fail. Further, when the amount of control is great, occurrence of an unwanted increase or decrease in display status can be prevented, so that an appropriate display can be provided without regard to the amount of control.

According to an aspect of the invention, as a result of provision of the second display portion, the control condition of a turning force status, incorporating the driving performance of the vehicle, can be visually ascertained.

According to an aspect of the invention, the control condition of a degree of differential limit is displayed at a position between the control condition of the state of turning force exerted on the left wheel(s) and the control condition of the state of turning force exerted on the right wheel(s). Hence, the control condition of a turning force status, incorporating the driving performance of the vehicle, can be visually ascertained in an intuitive manner.

The present invention can be utilized in an industrial field of a turning behavior display device which displays the condition of turning behavior control of a vehicle having a turning behavior control unit.

The invention thus described, it will be obvious that the same say be varied in many ways. Such variations are not to be regarded as a departure from the spirit and scope of the invention, and all such modifications as would be obvious to one skilled in the art are intended to be included within the scope of the following claims.

What is claimed is:

1. A turning behavior display device, operable to display control condition of a turning behavior control unit which controls turning behavior of a vehicle in a turning direction by using a relative difference between a first torque acting on one of left and right wheels of the vehicle and a second torque acting on the other of the left and right wheels of the vehicle, the turning behavior display device comprising:
   first display portions, provided for the left and right wheels, and adapted to increase or decrease in the turning direction in accordance with the relative difference from a first reference section, provided at a center of each first display portion, used when the first torque is equal to the second torque;
   a second display portion for showing a degree of differential limit between front wheels and rear wheels; and
   a control unit that controls the first display portions, such that each of the first display portions increases or decreases in a slower manner as the relative difference becomes greater, wherein
   the second display portion is arranged between the first display portions, and
   the second display portion increases or decreases, in accordance with the degree of the differential limit, from a second reference section provided at a center of the second display portion, the second reference section being provided at a position corresponding to the first reference section of the first display portions, such that the first reference section aligns with the second reference section.

2. The turning behavior display device according to claim 1, wherein
   the first torque is greater than the second torque,
   the first display portion corresponding to the first torque increases by a predetermined level, and
   the first display portion corresponding to the second torque decreases by the predetermined level.

3. The turning behavior display device according to claim 1, wherein
   each of the first display portions increases by increasing the number of segments one by one in a first direction or decreases by increasing the number of segments one by one in a second direction opposite to the first direction.

4. The turning behavior display device according to claim 1, wherein
   each of the first display portions increases or decreases in a circular-arc pattern.

5. The turning behavior display device according to claim 1, wherein one of the first display portions increases and the other of the first display portions decreases so that the first display portions are symmetrical with each other.

* * * * *